(No Model.) 2 Sheets—Sheet 1.

J. WALKER.
CLUTCH.

No. 474,429. Patented May 10, 1892.

WITNESSES.
Frank Miller.
M. S. Ingham.

INVENTOR.
John Walker
By his attorney
E. L. Thurston (No Model.) 2 Sheets—Sheet 2.

J. WALKER.
CLUTCH.

No. 474,429. Patented May 10, 1892.

WITNESSES.
Frank Miller.
M. S. Ingham.

INVENTOR.
John Walker
By his attorney
E. L. Thurston

UNITED STATES PATENT OFFICE.

JOHN WALKER, OF CLEVELAND, OHIO.

CLUTCH.

SPECIFICATION forming part of Letters Patent No. 474,429, dated May 10, 1892.

Application filed February 4, 1892. Serial No. 420,338. (No model.)

*To all whom it may concern:*

Be it known that I, JOHN WALKER, a citizen of the United States, residing at Cleveland, in the county of Cuyahoga and State of Ohio, have invented certain new and useful Improvements in Friction-Clutches, of which the following is a specification.

My invention relates to that class of friction-clutches in which one member is moved lengthwise of the shaft toward another member for the purpose either of causing the engagement of said members or of causing them to grasp an interposed drum, disk, or series of disks. Devices of the above class may be employed either to frictionally couple together two independent shafts arranged in the same axial line or to connect at will a shaft and a pulley or gear loosely mounted thereon.

My invention, hereinafter described and claimed, relates to the mechanism with which the movable friction member is caused to slide toward and from the fixed member of a clutch of the above-described class; and it is in the nature of an improvement upon the mechanism for the purpose shown and described in my prior patents, No. 424,631, dated April 1, 1890, and No. 434,122, dated August 12, 1890.

Figure 1:
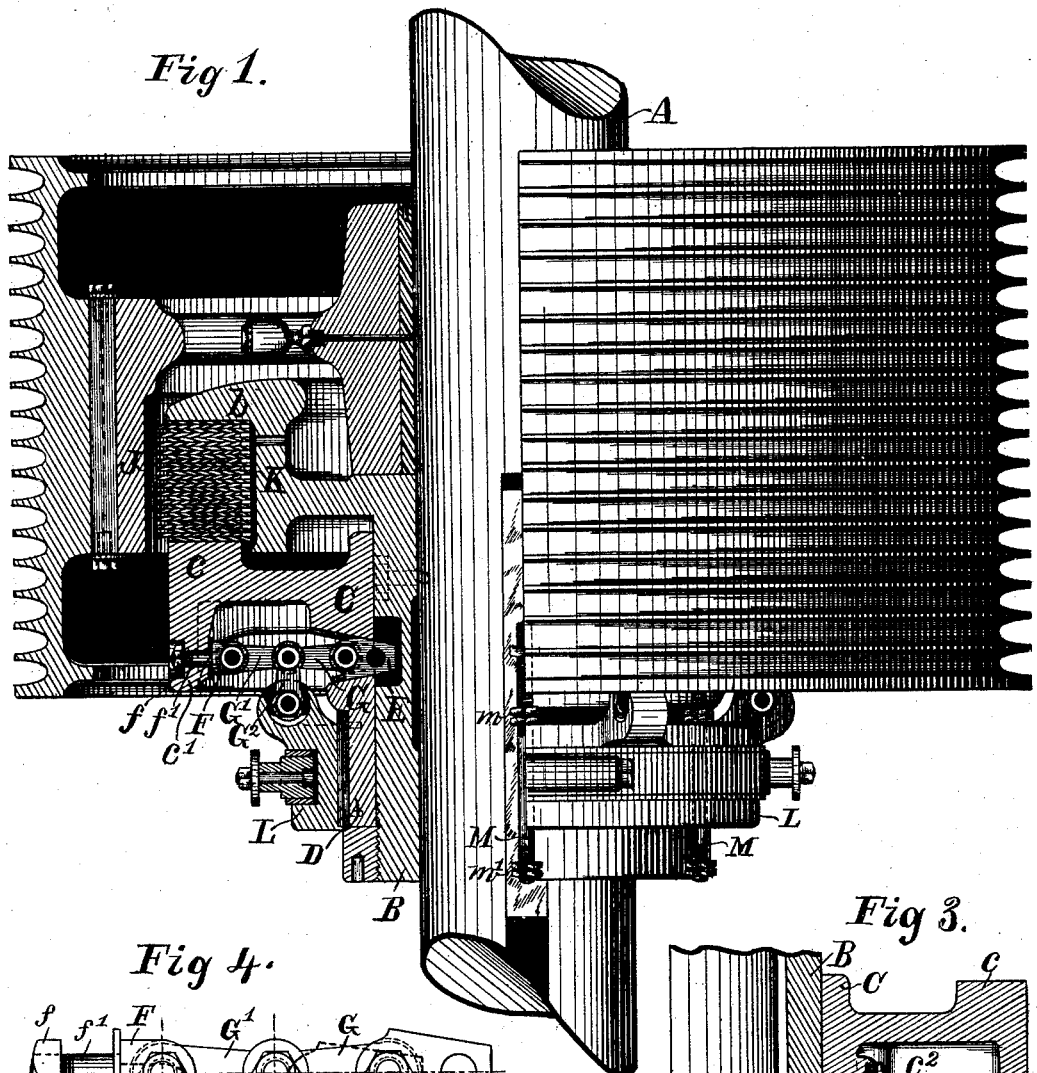
Figure 4:
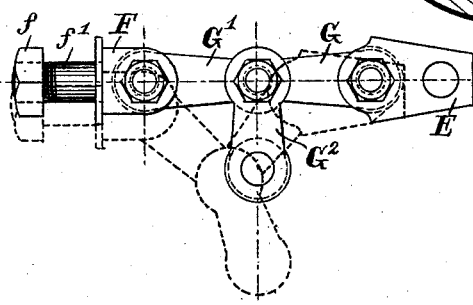
Figure 3:
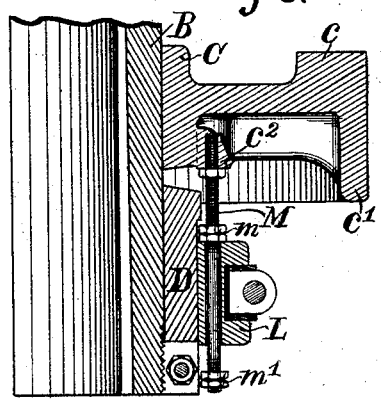
Figure 2:
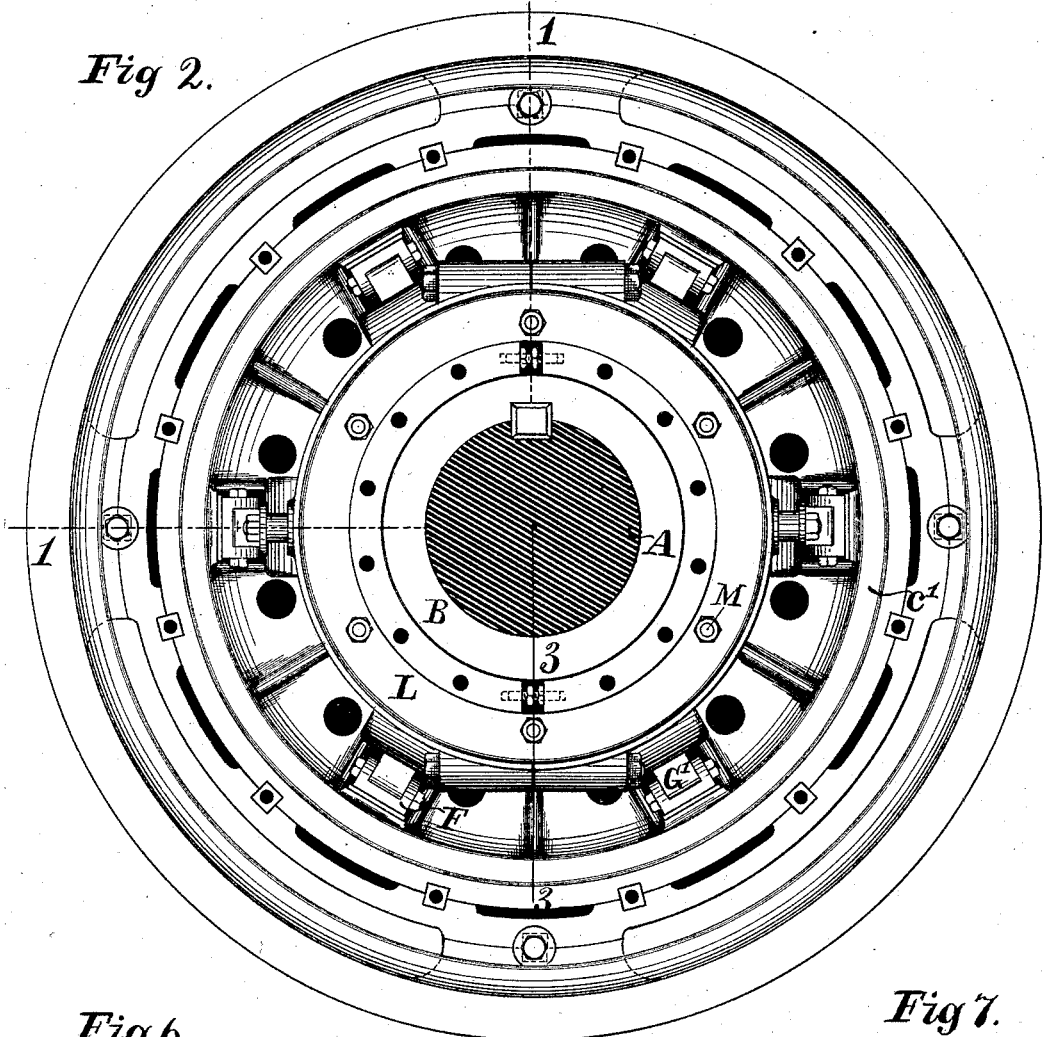
Figure 6:
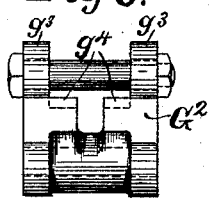
Figure 5:
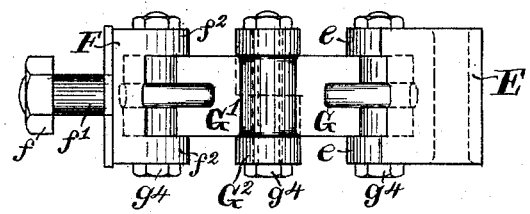
Figure 7:
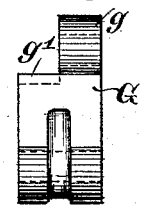

In the drawings, Figure 1 is a side elevation of a clutch provided with my invention, the left half of the view being a longitudinal section in the plane indicated by line 1 1 in Fig. 2. Fig. 2 is an end view of said clutch from the under side of Fig. 1. Fig. 3 is a longitudinal sectional view in the plane indicated by line 3 3 of Fig. 2 through the sliding clutch member and the parts on the left of said member, as shown in Fig. 1. Fig. 4 is an enlarged view of the wedge and its operating-toggle, showing the movements of the parts. Fig. 5 is a view of the parts shown in Fig. 4, viewed from the under side of said figure. Fig. 6 is a detached view of the link $G^2$, and Fig. 7 is a detached view of one of the links G.

Referring now to the parts by letters, A represents the shaft, and B a sleeve keyed thereto, having the flange $b$, which lies in a plane at right angles to the axis of the shaft.

C represents a sleeve, which surrounds and is slidable on the sleeve B, but is compelled to revolve with it by reason of a tongue-and-groove connection between them. The sleeve C is provided with a flange $c$, which is parallel to the flange $b$. The sleeve C and its flange constitute the movable clutch member and the flange $b$ is the fixed clutch member. The movement of the flange $c$ toward the flange $b$ causes the interposed loose part or parts, which are shown in the drawings in the form of a series of disks J K, to be grasped between them.

A collar D surrounds the sleeve B, and is held in fixed relation to the sleeve B (and consequently to the shaft A) during the clutching and unclutching movements of the sleeve C. At suitable intervals the proximate faces of the collar D and sleeve C are provided with oppositely-beveled surfaces, against which the wedges E act.

The mechanism shown in the drawings, which I have already explained, is substantially like that shown in my prior patents, hereinbefore referred to and therein fully explained.

$c'$ represents a bracket, which is rigid with the flange $c$ and projects therefrom over the rear end of the sleeve C. There are as many of these brackets as there are wedges employed.

F represents a jaw-piece. There are several of these jaw-pieces, one of which is secured by means of the threaded stud $f'$ and nut $f$ to each of said brackets, and extends therefrom inward toward the axis of the shaft. These jaw-pieces may be adjusted by the insertion of metallic packing between them and the brackets to which they are attached, whereby the wedges E are moved farther inward when the toggle is straightened, as hereinafter explained.

E represents a wedge which is adapted to be thrust inward toward the axis of the shaft between and in engagement with the beveled surfaces above mentioned on the faces of the sleeve C and collar D, thereby causing the sleeve C to move away from the collar D and consequently toward the flange $b$.

Each of the wedges E is moved outward and inward between the sleeve C and collar D by means of a toggle. The inner link G of the toggle is pivoted to the wedge E, and the outer link $G'$ is pivotally connected to one of the jaw-pieces F. When the toggle is straightened, the wedges are forced inward between the faces of the fixed collar D and movable sleeve C, with the result hereinbefore set forth.

$G^2$ represents a link which connects the toggle-joint with the longitudinally-sliding sleeve L, whereby when the sleeve is moved in one direction its movement, transmitted through the link $G^2$, straightens the toggle, while its motion in the opposite direction bends the toggle, which thereby draws the wedge outward. The sleeve L, as shown, is mounted on the collar D, with which it is connected by means of a tongue and groove.

The means provided for positively moving the sleeve C and its flange $c$ away from the flange $b$ consists of the rods M, which slide through suitable orifices parallel with the axis of the shaft formed in the sliding sleeve L and which screw into a lug $c^2$ on the sleeve C or are connected therewith in some other suitable manner.

$m\ m'$ are nuts adjustable upon the rod M, lying on opposite sides of the sleeve L. In moving the sleeve L forward to straighten the toggle the nut $m$ acts as a stop to limit this forward movement. When the sleeve L is moved backward, it first bends the toggle, and thereby causes the withdrawal of the wedges, which leaves the sleeve C free to be moved backward. A further movement of the sleeve L brings it against the nut $m'$, whereby as the sleeve L is still further moved its movement is transmitted through the rod M to the sleeve C, which is thereby drawn positively backward. As many of these rods M and their nuts may be employed as desired, and the same statement may be made relative to the wedges and their operating-toggles. I have shown six systems of mechanisms for moving the sleeve C in both directions; but this number may be varied, as circumstances require.

For the purpose of making the invention hereinbefore explained as inexpensive and as durable as possible I have devised the specific construction shown in the drawings—that is to say, the links G G' are both alike, as shown in Figs. 5 and 7. The ends of said links, which are connected together, are made as shown at the top of Fig. 7—that is, they have an extension $g$ half as wide as said link, which is finished in cylindrical form. The other half of the end of said link is finished with a concave cylindrical surface $g'$. The extension $g$ on each link rests and operates against the concave surface $g'$ on the other link. The opposite ends of the said links are finished in cylindrical form and set between ears $e\ e$ on the wedges E and between ears $f^2\ f^2$ on the jaw-piece F, respectively, and bear against concave cylindrical surfaces on said parts between said ears. The link $G^2$ is bifurcated, as shown in Fig. 6, and the toggle-joint lies between the two ears $g^3$ $g^3$. The cylindrical ends of the links G G' bear against a concave cylindrical surface $g^4$ on the link $G^2$ between said ears $g^3\ g^3$. The three pivot-bolts $G^4$, which connect the toggle-links with each other, with the link $G^2$, with the wedge E, and with the jaw-piece F, are, by reason of the above-described construction, of the same length, and while they serve to hold the parts in place they are not called upon to bear any of the strain incident to straightening the toggle-joint.

Having thus described my invention, what I claim as new, and desire to secure by Letters Patent, is—

1. In a friction-clutch, in combination, a longitudinally-movable clutch member, a fixed collar, a wedge interposed between the proximate faces of said clutch member and collar, a toggle, one arm of which is pivoted to said wedge and the other arm to the clutch member, and means for operating said toggle, substantially as set forth.

2. In a friction-clutch, in combination, a longitudinally-movable clutch member having a flange at its forward end, a bracket on said flange extending rearward over the rear end of said clutch member, a fixed collar, a wedge interposed between said fixed collar and the rear end of the movable clutch member, a toggle, one link of which is pivoted to said wedge and the other link to said bracket, a sliding sleeve L, and a link connecting said sleeve and the toggle, substantially as set forth.

3. In a friction-clutch, a sleeve C, having a flange $c$, which surrounds the shaft and is adapted to be moved lengthwise thereof, a bracket $c'$, rigid with said flange, a collar D, fixed with relation to said shaft, and a movable wedge interposed between the proximate faces of said sleeve and collar, combined with a toggle, one arm of which is adjustably connected with the said bracket, the other arm being connected to said wedge, a sliding sleeve L, and a link pivotally connected with said sleeve and toggle, substantially as set forth.

4. In a friction-clutch, a longitudinally-movable clutch member, a sliding sleeve, and mechanism operated by said sliding sleeve, whereby the said clutch member is moved in the clutching direction, combined with rods secured to such clutch member, lying parallel to the axis of the shaft on which the clutch mechanism is supported and extending through said sleeve, and adjustable stops secured to said rods on both sides of said sleeve, substantially as set forth.

5. In a friction-clutch, a fixed collar D, a longitudinally-movable clutch member, wedges inserted between the proximate faces of said collar and clutch member, said wedges having the ears $e\ e$ and a concave bearing-surface between them, and the jaw-pieces F, each having ears $f\ f$ and a concave bearing-surface between them, combined with toggles consisting each of the similar links G G', having one cylindrical end, and having at the other end the cylindrical extension $g$ and the concave bearing-surface $g'$, the bifurcated link G², having the concave bearing-surface $g^4$, the pins G⁴, connecting said links with each other and with said wedges and jaw-pieces, respectively, and a sliding sleeve, to which the link G² is pivotally connected, substantially as set forth.

JOHN WALKER.

Witnesses:
GEO. J. ZAHN,
M. A. KENSINGER.